F. B. PFEIFFER.
TIRE VULCANIZER.
APPLICATION FILED AUG. 30, 1915.

1,231,645.

Patented July 3, 1917.
2 SHEETS—SHEET 1.

Witnesses

F. B. Pfeiffer
Inventor by

Attorneys

F. B. PFEIFFER.
TIRE VULCANIZER.
APPLICATION FILED AUG. 30, 1915.
1,231,645.
Patented July 3, 1917.
2 SHEETS—SHEET 2.
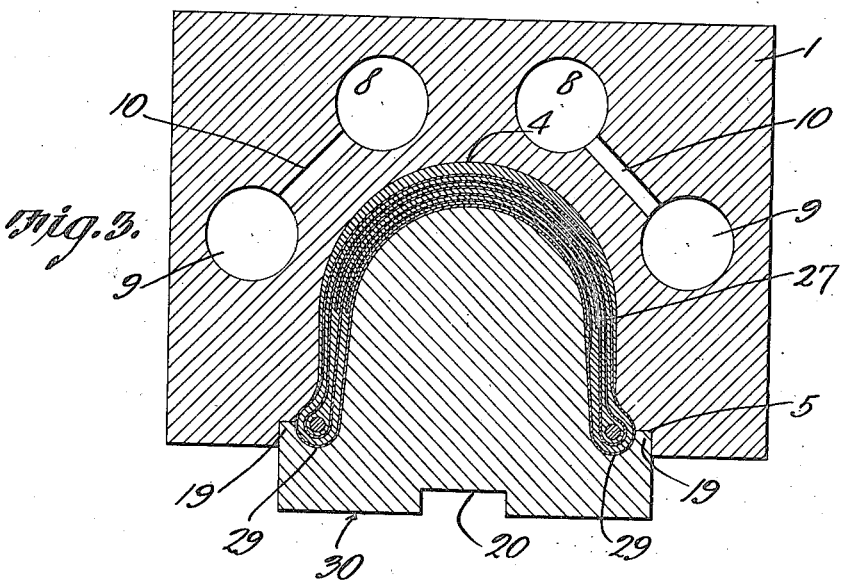
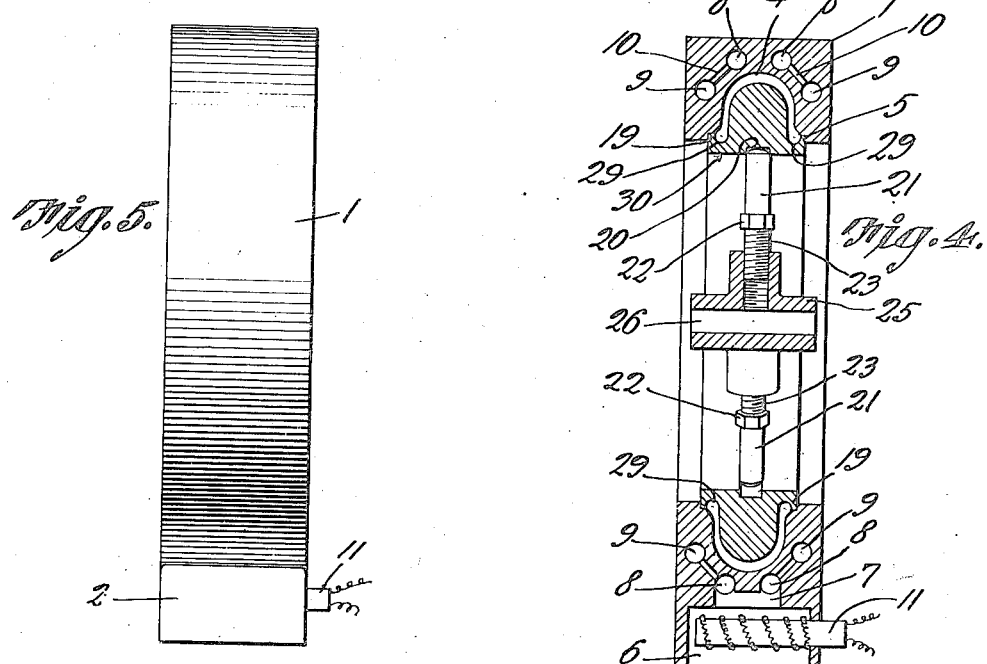
Witnesses
F. B. Pfeiffer, Inventor
by Attorneys

UNITED STATES PATENT OFFICE.

FRED BROWN PFEIFFER, OF AKRON, OHIO.

TIRE-VULCANIZER.

1,231,645.  Specification of Letters Patent.  Patented July 3, 1917.

Application filed August 30, 1915. Serial No. 48,032.

*To all whom it may concern:*

Be it known that I, FRED B. PFEIFFER, a citizen of the United States, residing at Akron, in the county of Summit and State of Ohio, have invented a new and useful Tire-Vulcanizer, of which the following is a specification.

The device forming the subject matter of this application is adapted to be employed for building up and vulcanizing tire casings.

The invention aims to improve the construction of the mold and the core, so far as the relation between these elements and the casing is concerned.

The invention aims to improve the means whereby the mold is heated.

Another object of the invention is to improve the core and the means for expanding the core.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Fig. 3 is a transverse section through the core and the mold;

Figure 1:
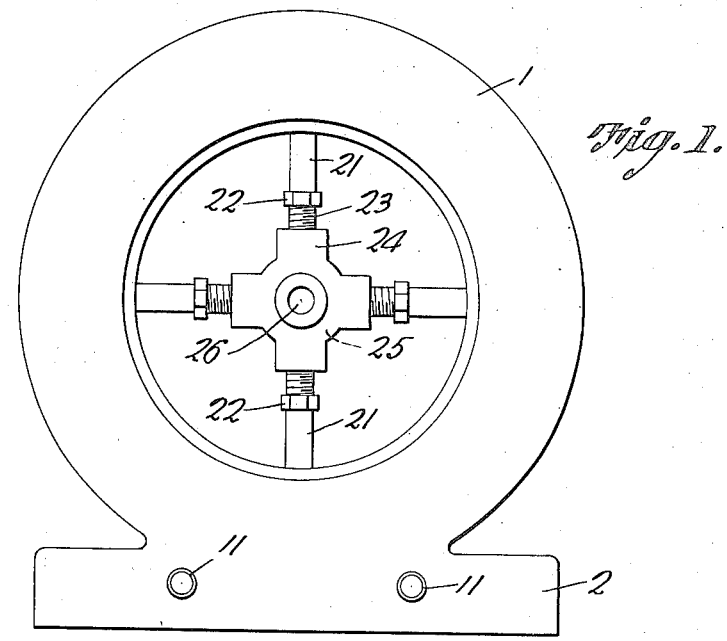
Figure 1 shows the invention in side elevation.
Figure 2:
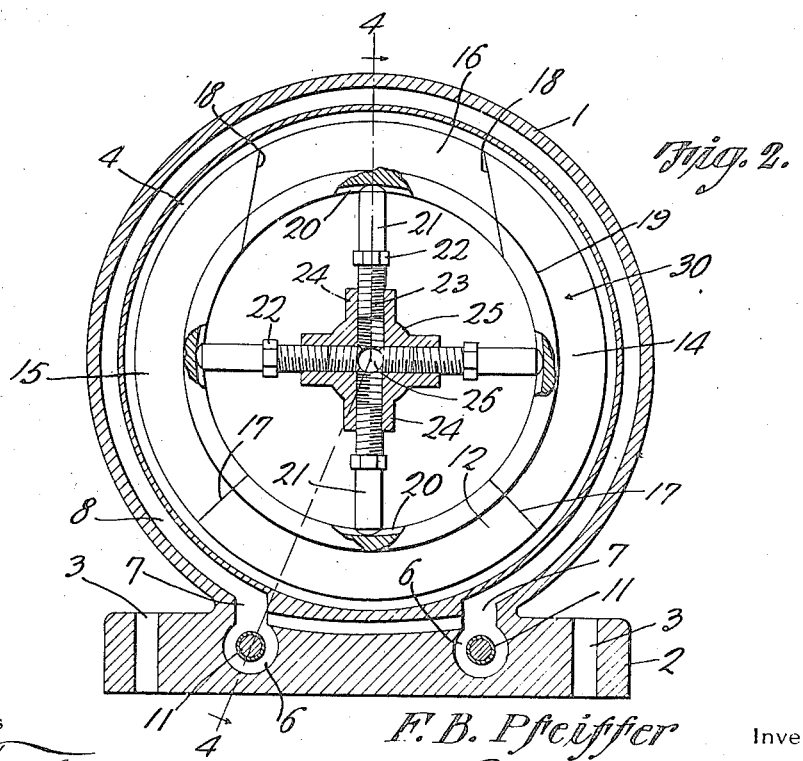
Fig. 2 is a vertical section.

Fig. 4 a section taken approximately on the line 4—4 of Fig. 2;

Fig. 5 is an end elevation of the complete structure.

In carrying out the present invention there is provided an annular mold 1 preferably made of metal and secured to or formed integrally with a base 2 having openings 3 adapted to receive securing elements (not shown) whereby the base may be assembled with a support. In the inner edge of the mold 1 there is formed a circumscribing channel 4, the transverse contour of which depends upon the construction of the casing which is to be handled. Along the lateral edges of the channel 4 and adjacent the inner edge of the mold 1 lateral recesses 5 are formed.

In the base 2 are located transverse passages 6 having extensions 7 communicating with continuous, annular conduits 8 located within the contour of the mold 1, continuous annular conduits 9 being fashioned in the mold, the conduits 8 and 9 at the respective sides of the mold being connected at intervals by reduced ducts 10. Any suitable means may be provided for heating the mold 1, but in the present instance, electrical heaters 11 are introduced in the passages 6.

The invention comprises a core denoted generally by the numeral 30 and adapted to coöperate with the channel 4 of the mold 1. The core 30 embodies a plurality of sections and any number of sections may be provided. In the present instance, four sections are shown, the sections being denoted respectively by the numerals 12, 14, 15 and 16. The abutting end faces of the sections 12 and 14 and 15 are radially disposed, as indicated at 17. The section 16, however, is of wedge-shape, considered circumferentially and its end faces converge as they extend outwardly, as indicated at 18, the adjacent faces of the sections 14 and 15 being shaped accordingly, so that when the section 15 is forced outwardly, the same will act as a wedge and expand the entire core. The sections of the core 30 are provided along their longitudinal edges with ribs 19 which are received in the recess 5 of the mold 1, the construction being such that the core cannot shift transversely of the mold. Consequently, the chamber defined between the core and the mold always is of constant cross section and the casing which is compacted and vulcanized between the core and the mold need not have a varying cross section. Inwardly of the ribs 19, the constituent sections of the core are provided with grooves or seats 29. All of the sections are provided in their inner edges and adjacent the median line of the structure with communicating grooves 20. These grooves 20 are adapted to receive the expanding means now to be described.

The expanding means comprises a plurality of screws 21, the outer ends of which are received in the grooves 20 of the core sections. The screws 21 are equipped intermediate their ends with wrench faces 22 and are threaded as shown at 23 into tubular necks 24 constituting a part of a hub 25 having an opening 26.

In practical operation, the casing 27 is shaped and built up in the channel 4 of the mold 1, the sections 14, 12 and 15 of the core are mounted in place and finally the wedge-shaped section 16 of the core is introduced between the sections 15 and 14 of the core.

The screws 21 of the expander are retracted and the expander is located within the core, whereupon if the screws be advanced, the same will enter the grooves 20 of the core sections and effect an adequate expansion of the core, the same entering within the contour of the casing and shaping the casing properly in connection with the mold 1 and its recess 4. The seats 29 in the core sections are adapted to receive the beads along the longitudinal edges of the casing 27. Owing to the fact that the grooves 20 in the casing sections communicate to form a continuous annular channel, the expander may be shifted, so that the screws 21 will bear properly against and sustain the several parts of the core.

I am aware of the fact that no specific form of tire casing can be claimed in the same application with a tire building machine, and therefore, the casing has not been described in detail.

After the casing 27 has been built up and shaped properly by the coöperation between the mold 1 and the core 30, in a manner which will be obvious when Fig. 3 is compared with Fig. 2, the mold is heated to the desired extent, to procure the necessary vulcanization.

Having thus described the invention, what is claimed is:—

1. In a device of the class described, an annular mold and a base assembled with the mold; the base having a transverse passage, and the mold having a circumscribing conduit communicating with the passage; a heating means projecting into the passage; and a core coöperating with the mold.

2. In a device of the class described, an annular mold and a base assembled with the mold, the base having a transverse passage, and the mold having laterally spaced conduits communicating with the passage, the mold being provided with ducts connecting the conduits at intervals; and a core coöperating with the mold.

In testimony that I claim the foregoing as my own, I have hereto affixed my signature in the presence of two witnesses.

FRED BROWN PFEIFFER.

Witnesses:
 CLARA J. PHILLIPS,
 CATHERINE A. PFEIFFER.